Sept. 1, 1936.   H. P. SCOTT, JR   2,052,899
PREEXTENDED CORK
Filed May 5, 1934
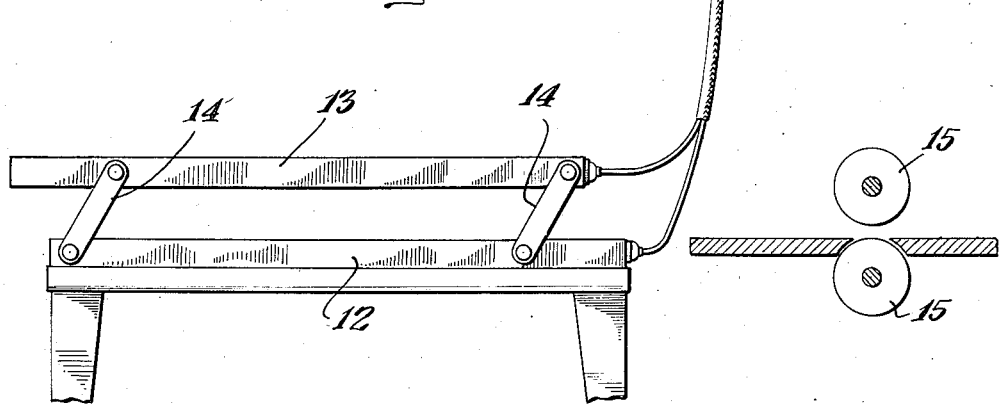
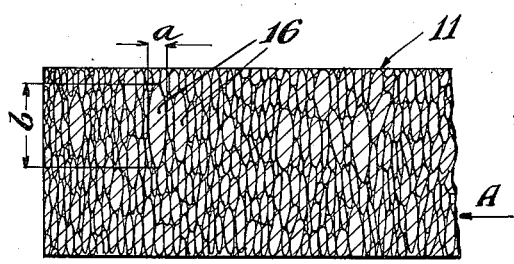 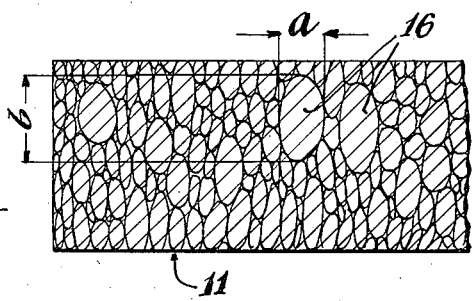
INVENTOR
Henry P. Scott, Jr.
BY Hoguet & Neary
ATTORNEYS Patented Sept. 1, 1936

2,052,899

UNITED STATES PATENT OFFICE 2,052,899

PREEXTENDED CORK

Henry P. Scott, Jr., Wilmington, Del., assignor, by mesne assignments, to Bond Manufacturing Corporation, Inc., Wilmington, Del., a corporation of Delaware Application May 5, 1934, Serial No. 724,117

6 Claims. (Cl. 18—48)

This invention relates to a method of pre-extending sheets and other molded shapes of composition cork, so as to render them substantially free from any tendency to undergo permanent changes in shape and surface dimensions when subjected to heat and pressure and/or moisture under service conditions. The invention also includes the pre-extended composition cork product resulting from the method of treatment.

In making composition cork by applying heat and pressure to cork granules in a mold to bind the granules adhesively by means of a binder into a compact mass it is necessary to apply heavy pressure to cause adjustment of the positions of granules of various sizes and shapes with respect to each other for insuring a proper bonding of contiguous granules and for producing a mass that is of uniform density and free from openings extending partially or completely therethrough.

The use of heavy pressure results in some of the cork granules, particularly the larger ones, being highly compressed and considerably distorted from their normal shapes. The compressed granules are prevented from expanding to normal shapes due to the restraining action exerted thereon by the walls of the mold, and, where the mass is formed by introducing and compacting a series of small charges in the mold, the successive applications of pressure to compact the several charges also acts to prevent normal expansion of compressed granules. According to the present practice the mass is not discharged from the mold until it has been cooled and set to such an extent that the granules are held in their highly compressed state.

It results that stresses are set up in the mass which make for unequal expansion and sometimes warping. These changes in shape and dimension may take place over a considerable interval of time and are particularly accentuated when the cork is used in situations where it is subjected to heat and moisture. When repeatedly subjected to such conditions, with intervening periods of normal temperatures and dryness, the result is frequently that objectionable alternate expansion and contraction takes place, but in all cases the cork, as heretofore produced, is characterized by a tendency to change permanently in use.

This problem is one of long standing. It has been proposed heretofore to effect some measure of stabilization of composition cork that has been molded by a discontinuous process in the form of relatively thick blocks or slabs. By "discontinuous" I mean a process in which a given quantity of cork granules and binder is confined in a closed mold in a single operation, as contrasted with the process wherein the cork granules are fed in successive increments into one end of an open-ended mold from which the molded product is being discharged substantially continually at the other end. According to the prior proposal, the molded block or slab is subjected to a controlled heat treatment following molding, with a view to effecting a stabilized condition in the cork. The mass is then subdivided into units of the size desired for ultimate use. My investigations show that stabilization to a satisfactory degree is not effected by merely heating a molded mass of composition cork. This is particularly the case where the molded mass is relatively thick or massive. Furthermore, when such a heat treated mass is subdivided into smaller units, these units will undergo irregular expansion.

One object of the present invention is to produce a sheet of composition cork that is "pre-extended" in the sense that the more or less permanent changes that ordinarily take place due to expansion of the compressed granules upon subjecting the sheet or articles formed therefrom to heat and pressure and/or moisture have already been produced in the sheet during its manufacture in accordance with my improved process and the surface dimensions of the sheet are stabilized and substantially free from any tendency to change under service conditions.

Another object is to produce a composition cork sheet that is of a uniform resiliency throughout approximating that of natural cork and which in flexibility exceeds composition sheets made by other processes.

Another object is to produce a composition cork sheet that is resistant to the disintegrating influences of heat and moisture and at the same time is highly resilient and pre-extended so that it is substantially free from any tendency to alter its surface dimensions when repeatedly subjected to the influence of heat and moisture, as, for example, when used as laundry pads and in analogous situations.

Another object is to produce from pre-extended composition cork sheets various desired shapes such as coverings for rolls and the like.

Other objects and advantages of the invention will become apparent upon consideration of the following description and appended claims when read in conjunction with the accompanying drawing.

In carrying out the invention a composition cork sheet is heated to an extent sufficient to soften the cork mass and the sheet while heated is mechanically treated by being passed between rolls set to a clearance less than the thickness of the sheet for relieving the granules from compressive stresses, thereby causing the sheet to expand to a pre-extended condition in which its internal structure is in a state of equilibrium and its surface dimensions are stabilized.

In the drawing:

Figure 1 is a diagrammatic view of one form of apparatus suitable for pre-extending composition cork sheets in accordance with the present invention;

Figure 2 is an enlarged sectional view of a portion of a sheet of composition cork formed by applying pressure and heat to cork granules in a mold in the presence of a binder; and Figure 3 is an enlarged sectional view of a portion of the sheet of composition cork after treatment to pre-extend it in accordance with the present invention.

In practising the present invention the composition cork may be formed in accordance with any of the accepted methods for molding cork granules into a compacted mass by the application of pressure and heat in the presence of a suitable binder for uniting the granules. A method that I have found to be particularly advantageous is the extrusion method carried out in an extrusion machine constructed and operated on the principles disclosed in U. S. Letters Patent No. 1,453,617, dated May 1, 1923. Various known binders may be used but in practising the present invention it is preferred to use a phenol condensation resin as the binder in view of certain advantages ensuing from its use, as will be set forth later.

The composition cork, either in the form of the sheet or of slab that comes from the extrusion machine, or after it has been sliced into two or more thinner sheets, is heated sufficiently to soften the cork mass for permitting ready working of the sheet to relieve the distorted granules of compressive strains and cause readjustment of their relative positions and expansion of the sheet.

The heating of a sheet 11 is preferably effected by placing it between a pair of heated platens 12, 13, which are brought into close contact with the upper and lower surfaces of the sheet. In the arrangement diagrammatically illustrated in Fig. 1, the platen 12 is stationary and the platen 13 is connected thereto by hinge plates 14 for movement toward and away from the surface of a sheet of composition cork placed on platen 12. The surfaces of the platens 12 are heated to a temperature of about 280° F., as by means of steam passages or electrical resistance units disposed within hollow portions of the platens. The desired softening will have been effected when the sheets have been heated for an interval of about four minutes. Although a specific temperature has been mentioned it should be understood that the temperature applied is not critical and, if desired, the sheets may be subjected to a higher temperature for a shorter interval so long as the degree of heat is not sufficiently high to cause undesired loss of volatile constituents of the cork or binder, or to cause charring of the cork.

Other methods may be employed for heating the sheets to effect the desired softening; for example, they may be immersed or floated in a suitable hot bath and turned at intervals in order to heat them uniformly.

After the sheets have been heated until the cork composition has been rendered soft and very pliable, they are immediately passed a number of times between a pair of driven rolls 15 set to a clearance about half that of the thickness of the sheet.

Instead of a single pair of rolls between which the sheet is passed a number of times, the rolling apparatus may comprise a series of pairs of rolls set either at corresponding clearances or with the clearance between the rolls of each pair gradually narrowing to the minimum clearance. It will be understood that various other arrangements of apparatus may be used.

As illustrated in Figure 2, the direction in which pressure was applied to compact the granules is indicated by the arrow A. The application of high pressure to the mass of cork granules in the molding operation for adjusting their relative positions to obtain a firm bond and secure a mass of uniform density has resulted in some of the large granules 16 having become greatly compressed from their normal roughly spheroid shapes to distorted ovate shapes with their minor axes $a$ lying in the direction that pressure has been applied to compact the granules in the mold and with their major axes $b$ extending in the direction of thickness of the sheet 11. When the sheets are obtained from a larger molded mass, they are preferably cut with their longest dimension extending in the direction in which pressure was applied to compact the granules, or in the direction indicated by the arrow A, Fig. 2. The sheets 11, after heating to soften the cork, are passed longitudinally between the rolls 15 and, hence, the major axes $b$ of the distorted roughly ovate granules are disposed normally to the direction of movement of the sheet and parallel with the direction in which the rolls 15 apply pressure to the opposite surfaces of the sheet, the application of pressure by rolls 15 being due to the fact that the clearance between the rolls is less than the thickness of the sheet. Consequently, as the sheet passes between the rolls its internal granular structure is mechanically worked as the rolls, by effecting a flattening of the distorted granules (or in other words a reduction of their major axes $b$), relieve the granules from compression and produce a readjustment of the shapes and positions of the granular components of the sheets. Inasmuch as the rolls 15 in contact with the opposite major surfaces of the sheet restrain it from expanding in the direction of its thickness, the mechanical working and expanding of the previously highly compressed granules results in the sheet expanding longitudinally and laterally as it passes between the rolls and in the intervals between successive passages between a single pair of rolls, or while travelling between successive pairs of rolls where a series are employed.

In order that the effects obtained by heating and rolling the sheets in accordance with the present invention may be fully understood and appreciated, the following examples are given of actual results obtained in treating a number of sheets to pre-extend them. When treatment of more than a single sheet is indicated in the following examples, the dimensions given are the averages of all the sheets of each group.

|  | Length | Width | Thickness |
|---|---|---|---|
|  | Inches | Inches | Inches |
| 10 sheets before treatment | 49 | 22 | .404 |
| 10 sheets immediately after treatment | 60.2 | 23.45 | .390 |
| 10 sheets 24 hours after treatment | 59.7 | 23.42 | .395 |
| 10 sheets before treatment | 48.4 | 19 | .403 |
| 10 sheets immediately after treatment | 60.7 | 20.3 | .399 |
| 10 sheets 24 hours after treatment | 60.1 | 20.1 | .389 |
| 1 sheet before treatment | 20 | 12 | .510 |
| 1 sheet immediately after treatment | 25.5 | 12.5 | .489 |
| 1 sheet 24 hours after treatment | 24 | 12 | .483 |

Consideration of the above data reveals that when measured immediately after being heated and mechanically worked by rolling in accordance with the present invention, the sheets are found to have expanded considerably in length and width while diminishing only slightly in thickness, and that cooling for 24 hours resulted in only very slight contraction in length and width due to shrinkage. It may also be observed that in the above instances the treating of the sheets resulted in average net changes of expansion of approximately 24% in length and of 6% in width. The thicknesses decreased about 3%, which, considering that the average thickness of the untreated sheets was less than a half inch, is negligible for all practical purposes. These examples also illustrate that the dimensions of the sheets have not been changed by merely reducing the thickness of the sheets to effect expansion in length and width by simply readjusting or redistributing the mass, but that the expansion in the length and width of the sheets has been attained by mechanically readjusting the shapes and positions of the highly compressed granules and relieving them of compression so that they may expand to more normal shapes.

Articles made from pre-extended composition cork treated in accordance with the invention are particularly suitable for use under conditions in which they are subjected to moisture, heat and/or pressure as, for example, where sheets thereof are employed on the platens or rolls of ironing and pressing machines. Inasmuch as such sheets have been pre-extended to a state of substantial equilibrium the application of heat, moisture and pressure thereto does not produce either expansion or contraction thereof to an objectionable extent requiring trimming or frequent replacement of the sheets. Laundry pads made from pre-extended composition cork are part of my invention. The pre-extended composition cork is also found to be particularly suited for use as flooring, for example, tile, or in sheet or strip form.

The pre-extended cork has the further advantage that it will acquire a permanent set in a desired shape if it is pressed on a definite form while heated sufficiently to cause thorough softening of the cork composition, say, to around 280° F., and is then cooled while being so held. This increases the usefulness of the cork since in this way it is possible to prepare pre-extended pre-formed shapes of various kinds, including coverings for rolls of almost every description.

The use of a phenol condensation resin as a binder for the cork granules of composition cork enables the latter to be safely heated to soften the cork composition mass in carrying out the present invention, without impairment of the binder. Such resins are also moisture proof to a high degree and protect the cork from disintegration.

I claim:

1. The method of pre-extending pre-set composition cork originally formed by applying heat and pressure to cork granules in a mold or the like in the presence of a binder, which comprises heating said composition cork to render it soft and pliable, mechanically treating said cork when so heated by applying pressure thereto in a different direction than that applied thereto in the mold to relieve the granular components thereof from compressive stresses that act to cause change in its surface dimensions, and cooling said cork to set the granular components thereof in a state of equilibrium in which its surface dimensions are stabilized and substantially free from tendency to change when subsequently subjected to heat, pressure and moisture.

2. The method of pre-extending a pre-set composition cork sheet originally formed by applying heat and pressure to cork granules in a mold or the like in the presence of a binder, which comprises heating said sheet to render it soft and pliable for permitting expansion of the surface dimensions of said sheet, and mechanically working said sheet while heated, by applying pressure in a direction normal with respect to that in which pressure was applied to compact its granules, thereby causing said sheet to expand laterally and longitudinally and relieving the granular components thereof of compressive stresses applied thereto in the molding thereof.

3. The method of pre-extending a pre-set composition cork sheet originally formed by applying heat and pressure to cork granules in a mold or the like in the presence of a binder, which comprises heating said sheet to render it soft and pliable for permitting expansion of the surface dimensions of said sheet and applying rolling pressure to said sheet while so heated in a direction normal to the sides of said sheet for causing said sheet to expand to a condition in which its surface dimensions are stabilized and substantially free from any tendency to further expansion or contraction when said sheet is subsequently subjected to moisture, heat and pressure.

4. The method of making pre-extended cork sheets which comprises forming a mass of composition cork by applying heat and pressure to cork granules in a mold or like in the presence of a binder, cutting a sheet from said mass with its longest dimension extending in the direction of the application of pressure to form said mass, heating said sheet to render it soft and pliable for permitting expansion of the surface dimensions of said sheet while so heated, and confining and compressing said sheet in the direction of its thickness by rolling it longitudinally to relieve its granular components of compressive stresses and cause expansion of said sheet laterally and longitudinally to a condition of equilibrium in which its surface dimensions are substantially stabilized.

5. The method of pre-extending a pre-set composition cork sheet originally formed by applying heat and pressure to cork granules in a mold or the like in the presence of a binder, which comprises passing said sheet through a heating zone to render it soft and pliable, passing said sheet while it is heated through a zone in which it is restrained from expansion in the direction of its thickness, and applying pressure against the major surfaces of said sheet while in said zone for causing said sheet to expand longitudinally and laterally to a condition in which its granular structure is in a state of equilibrium and the surface dimensions of said sheet are stabilized and substantially free from any tendency to change when subjected to moisture, heat and pressure under service conditions.

6. The method of forming a laundry pad of pre-extended composition cork which comprises first forming under pressure a sheet of composition cork bonded with a phenol condensation resin, then heating said sheet to render it soft and pliable to permit expansion of the surface dimensions of said sheet, and applying rolling pressure to said sheet while so heated in a direction different from that in which the original pressure was applied to relieve the granular components thereof of compressive stresses that act to cause change in its surface dimensions and cooling said cork to set the granular components thereof in a state of equilibrium in which the surface dimensions are equalized and substantially free from any tendency to change when the cork is subsequently subjected to heat, pressure and moisture.

HENRY P. SCOTT, Jr.